June 28, 1966           R. C. GREEN           3,258,596
PULSE-FREQUENCY MODULATED INJECTION LASER
Filed May 17, 1963           2 Sheets-Sheet 1
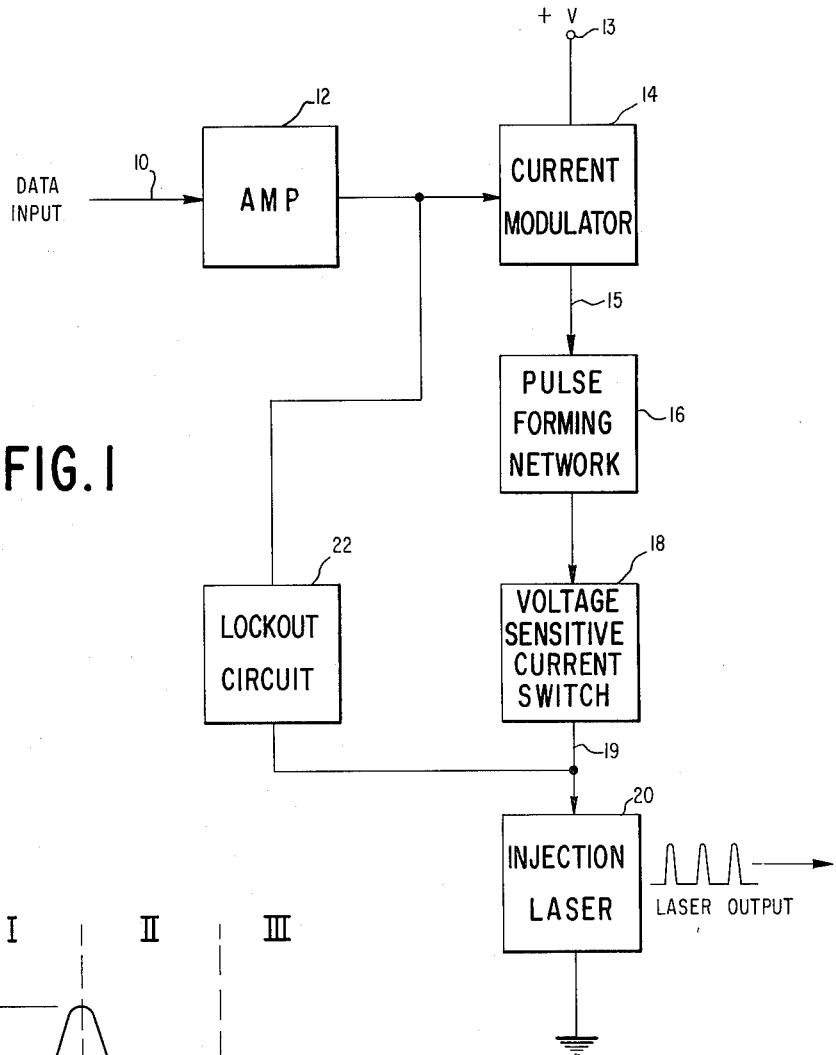
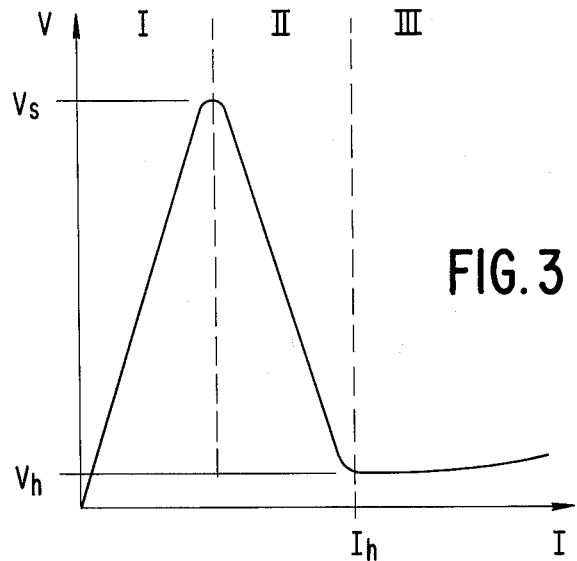
INVENTOR.
ROBERT C. GREEN
BY
*Richard H. Smith*
AGENT

United States Patent Office 3,258,596
Patented June 28, 1966

3,258,596
PULSE-FREQUENCY MODULATED
INJECTION LASER
Robert C. Green, Bethesda, Md., assignor to International Business Machines Corporation, New York, N.Y., a corporation of New York
Filed May 17, 1963, Ser. No. 281,156
4 Claims. (Cl. 250—199)

This invention relates to a device for transmitting information on a laser beam, and, more particularly, to an information transmitter which generates pulse-frequency modulated coherent radiation.

Lasers, sometimes referred to as optical masers, are devices which generate electromagnetic radiation in the infrared and optical frequency ranges of the electromagnetic spectrum. Because the radiation produced in a laser is generated by a phenomenon known as stimulated emission of radiation, it is temporally and spatially coherent, characteristics heretofore achievable only with electromagnetic radiation of much lower frequency. Further, by the use of proper materials and construction, laser resonators may be built which emit almost perfectly collimated radiation of substantially a single frequency. This means that a laser beam is a highly efficient medium for the transmission of electromagnetic energy, ideally adapted for long distance communication purposes.

Attempts have been made to construct communication systems utilizing the laser as an information carrying means, but heretofore such communication systems have been severely limited by their high power consumption, large size, lack of portability, etc. The recent development, however, of the current injection laser has seemed to provide an extremely useful communications tool. Until now, though, such lasers have been largely laboratory curiosities.

It is therefore an object of the present invention to provide a communication transmitter which both generates and information-modulates a laser beam by means of an injection current.

Another object is to provide a laser transmission device which is compact and reliable, and which operates on a low voltage, D.C. energy source.

A further object is to provide a modulation device which pulse-frequency modulates a laser beam.

Still another object is to provide an electrical circuit for pulse-frequency modulating the output of an injection laser.

Yet another object is to provide an electrical circuit for rapidly restoring a "breakdown" type current switching element to its high impedance state.

Still a further object is to provide a laser communication transmitter which generates an information bearing signal having a low susceptibility to distortion from external effects.

In accordance with the present invention electrical means are provided for operating a voltage-triggered current switching device at a repetition rate governed by an externally generated information bearing signal, the current switching device thereby providing a pulse-frequency modulated pump current to an injection laser.

The foregoing and other objects, features and advantages of the invention will be apparent from the following more particular description of a preferred embodiment of the invention, as illustrated in the accompanying drawings.

In the drawings:

FIG. 1 is a schematic diagram in block form showing the basic components of a preferred embodiment of the present invention.

FIG. 3 is a graph illustrating the characteristic V–I curve of a 4 layer diode, one of the components of a preferred embodiment of the invention.

Figure 2:
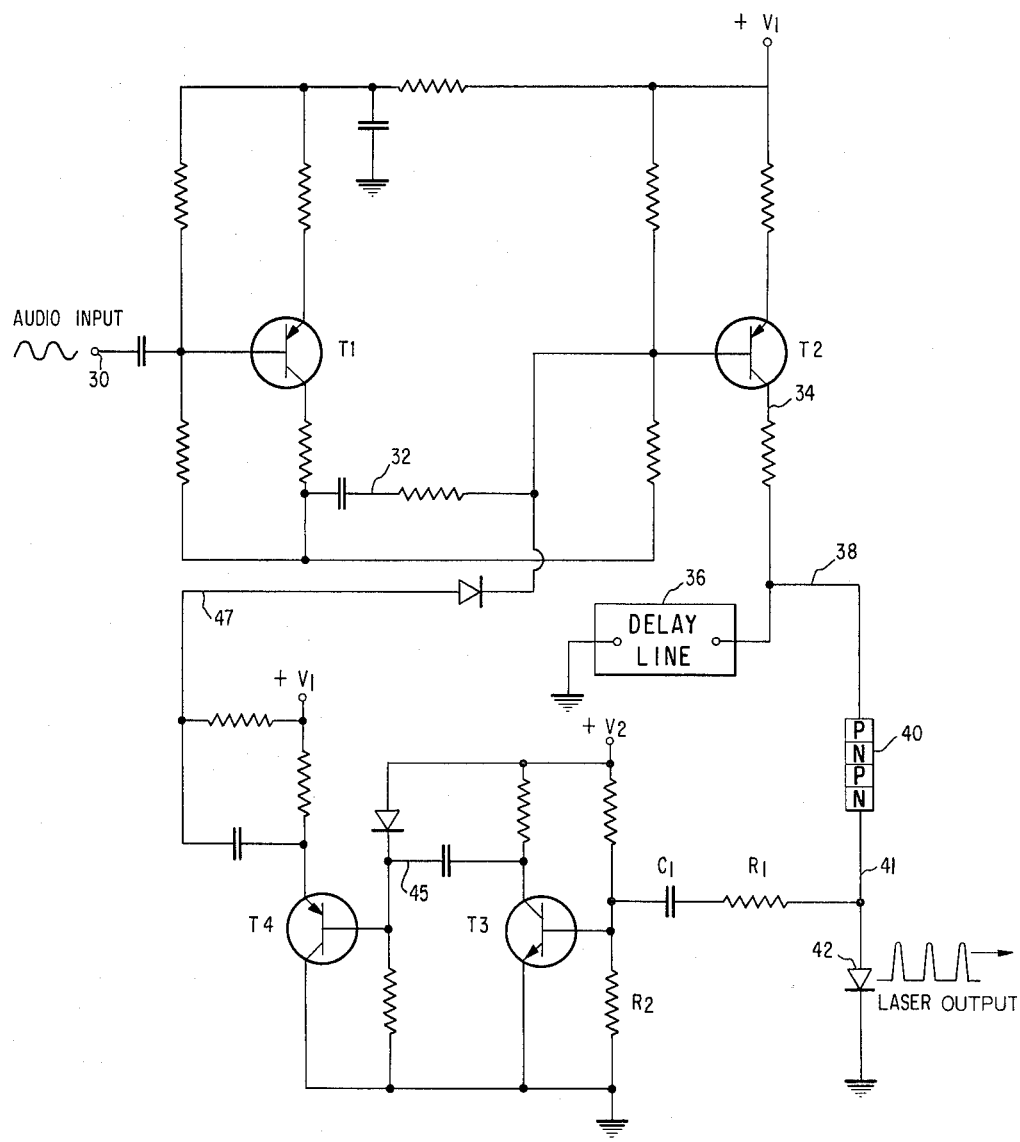
FIG. 2 is a schematic circuit diagram of the block circuit of FIG. 1.

Referring to the drawings, a detailed description of a preferred embodiment of the present invention will hereinafter be given. In the following description, the transmitter is described as a device for sending out a voice (audio) modulated optical signal. It is to be understood, however, that the present invention need not be restricted in its application to the transmission of audio information, but may also be used to transmit, for example, digital data signals.

FIG. 1 shows an audio modulated voltage signal being applied at input 10 to an amplifier 12. The output from the amplifier 12 is used to drive a current modulating element 14, one of four elements connected between a source of positive voltage 13 and ground. The instantaneous magnitude of the D.C. current flow on line 15 is thus made to conform to the instantaneous potential of the audio input 10. A pulse forming network 16 receives the modulated current from the line 15 and uses it to voltage condition a "breakdown" type current switch 18. The switch 18, in a manner to be subsequently described, switches from a high impedance to a low impedance when the voltage level across it reaches a predetermined value. When the switch is thus caused to break down, a current pulse generated by a capacitive element in the pulse forming network 16 is discharged through it and appears on output line 19. This pulse is fed to an injection laser device and momentarily turns that device "on." This causes an output pulse of radiation to project from the laser.

Breakdown devices such as the switch 18 tend to remain in their low impedance state once they have been switched into it. In order to manifest a chain of pulses from the switch it is necessary to provide some positive drive means to rapidly restore the switch to its high impedance state after each discharge pulse. To this end a lockout circuit 22 is provided. This circuit, which is subsequently described in detail, senses the presence of an output pulse on the line 19 and in response thereto emits a lockout pulse to the current modulating device 14. This pulse effects the restoration of the current switch to its high impedance state in a manner to be subsequently described in detail.

Upon restoration of the switch 18, another output pulse begins building up in the pulse forming network 16 and discharges, as above described, when the appropriate voltage is developed across the switch 18. The interval between successive output pulses is determined by the rate at which the capacitive element in the network 16 charges up to the predetermined voltage level required for switch breakdown. This rate is governed by the rate of current flow in the line 15, which, as previously mentioned, is modulated in accordance with the audio input signal. Thus it can be seen that the chain of pulses which appears on the line 19 is the pulse-frequency modulated equivalent of the audio modulated input signal applied on line 10. Amplitude characteristics of the input signal correspond to the pulse repetition rate of the PFM signal and frequency characteristics of the input signal are embodied in the PFM signal as the rate of change of the pulse repetition rate.

The PFM signal on line 19 is fed to the injection laser device 20 and causes a corresponding train of radiation pulses to be emitted therefrom. Thus is created a PFM optical or infrared signal. As previously noted, the coherence properties of this signal make it highly suitable as a long distance information carrying medium.

Optical receiving devices which may detect the signal and demodulate it are well known in the art. For example a photomultiplier tube, preferably equipped with suitable optics, may be used in conjunction with conventional PFM demodulation circuits as an adequate receiver for the signals generated by the transmitter of the present invention.

Referring to FIG. 2, a detailed description of the block circuit of FIG. 1 is hereinafter given. The audio input signal is supplied to a terminal 30 which is connected to the base of an amplifying transistor T1. An amplified audio signal is thereby sent via line 32 to the base of a transistor T2. The transistor T2 is normally biased for Class A operation and performs the function of the current modulator 14 of FIG. 1. The instantaneous magnitude of the D.C. current conducted through the transistor T2, conforms with the instantaneous voltage of the signal applied to the base of the transistor. Thus the current on line 34 is modulated in accordance with the audio modulated input signal at terminal 30.

The current on line 34 is fed to ground through a conventional L–C delay line 36 which acts a pulse forming circuit. The delay line 36 performs the function of the network 16 of FIG. 1. The capacitors of the delay line are charged at a rate depending upon the magnitude of current flow in the line 34. The level of potential existing on output line 38 thus depends upon the state of charge of the capacitors in the delay line 36. The rate of increase of potential on this line may thus be said to vary in accordance with the current flow in the line 34.

The P terminal of a PNPN diode switch 40 is connected to output line 38. The "four layer" diode 40 is a "breakdown" type of switching device and has a characteristic V–I curve as shown in FIG. 3. When operated in region I, the diode is essentially a high impedance device. As the voltage across the diode is increased, little increase in current is noticed. However, when switching voltage $V_s$ is reached, the device "breaks down" and rapidly switches through the region II to the region III where it becomes essentially a low impedance element. As long as a minimum holding current $I_h$ is maintained through the diode it possesses a low impedance characteristic and remains in region III. To restore the diode to its high impedance state the current being conducted through it must be reduced below the level of $I_h$.

Referring back to FIG. 2, the $n$ terminal of the diode switch 40 is connected to the anode of a semiconductor laser diode 42 by means of output line 41. The cathode of the diode 42 is grounded.

The lockout circuit, shown in FIG. 1 as the block 22, has as its fundamental elements the resistors $R_1$ and $R_2$, the capacitor $C_1$ and the transistors T3 and T4. The emitter of transistor T4 is coupled via a line 47 back to the base of the current modulating transistor T2. The transistor T3 is normally biased into conduction so that the capacitor $C_1$ has a low impedance charging path through the base-emitter junction of T3. However, when capacitor $C_1$ begins to discharge, the base-emitter junction of transistor T3 becomes reverse biased and the capacitor discharge current flows to ground through the resistor $R_2$. Transistor T3 is kept off for the duration of the discharge period of $C_1$, the length of which is determined by the time constant of the $C_1$–$R_2$ combination.

During the time that T3 is off a positive voltage pulse is produced on the line 45, amplified by an emitter follower transistor T4 and sent to the base of transistor T2 via the line 47. The amplitude of this positive "feedback" pulse is sufficient to bias transistor T2 into nonconduction, blocking all current flow to the diode switch 40. As previously explained, this condition is necessary to place the diode switch into its high impedance state. Since the current through the switch must be kept below the $I_h$ (FIG. 3) value for some finite length of time, typically several tenths of a micro-second, for restoration to occur, the values of $C_1$ and $R_2$ must be selected to give the "lockout" pulse a proper width.

The operation of the circuit to provide a PFM output signal on line 41 conforming in information content to the audio modulated input signal applied to terminal 30 is as follows. The capacitors of the delay line 36 are charged at a charge rate determined by the magnitude of the D.C. current flowing in line 34. The magnitude of this current at any given instant depends upon the magnitude of the audio modulated voltage signal being applied to the base of transistor T2. No current can flow in the output line 41 since the diode switch 40 is in its high impedance state.

When the potential across the capacitors of delay line 36 reaches the discharge level $V_s$ (FIG. 3) the switch 40 switches to its low impedance state and the delay line capacitors discharge a current pulse through the switch 40 onto output line 41. The rise time of this pulse is determined by the switching speed of the diode 40 and the width of the pulse is determined by the electrical length of the delay line 36. The fall time of the pulse depends on the Q of the delay line.

As the output pulse reduces to zero it is necessary to place the switch 40 back to a high impedance condition so that the circuit can be recycled and another pulse generated. The current flowing through transistor T2, however, is sufficient to keep the switch 40 in its low impedance state. The previously described lockout circuit comes into play at this point to momentarily cut off conduction through T2 so that the switch 40 can restore itself.

During the rise time of the output pulse the capacitor $C_1$ becomes charged. As the output pulse begins to fall, $C_1$ discharges through $R_2$ sending a "lockout" pulse to the base of transistor T2 in the manner previously discussed. The lockout pulse is of sufficient duration to bring about the restoration of the diode switch 40.

After restoration of the switch 40, the capacitors of delay line 36 begin to recharge through the transistor T2 and a new pulse generating cycle begins. In this manner a PFM signal corresponding in information content to the audio modulated input signal is generated on output line 41.

The semiconductor laser diode 42, being connected to output line 41, is turned on and off in accordance with the occurrence of output pulses. The radiation output thus emitted from the laser is an optical PFM signal embodying the information carried on the audio modulated input signal.

The laser diode may be any one of several types of such devices presently known. For example, a gallium arsenide injection laser diode can be utilized if the wave length of electromagnetic output radiations desired is on the order of 8,300 angstrom units. Other radiation frequencies can be obtained by the use of injection lasers constructed of different materials. It is desirable to impedance match the laser diode and its current leads with the delay line 36 so that an efficient current pulse discharge is obtained.

While the voltage sensitive current switch described in connection with the preferred embodiment is a 4 layer diode, other voltage sensitive breakdown switches, such as a gas filled thyratron tube, may also be used.

In recapitulation, it is to be noted that the transmitting device of the present invention generates an intelligence-bearing laser beam. It is to be noted that the transmitter is driven solely by a D.C. voltage source, e.g., a battery or a solar cell. In addition, the present invention makes use of the diode injection laser, which is an extremely simple and reliable generator of coherent radiation. By pulse operating the laser very efficient transmission of energy is achieved. Further, by employing a pulse-frequency scheme of modulation, the optical output signal is much less susceptible to distortion than would be a pulse-amplitude modulated signal or, generally, any AM signal. This is so because the receiving apparatus need only detect the presence of a pulse in order to decipher the signal. If the peaks were chopped off the pulses by, for example, dust particles in the air, reception would be unaffected, as long as some portion of each pulse were discernable to the receiver.

While the invention has been particularly shown and described with reference to a preferred embodiment thereof, it will be understood by those skilled in the art that the foregoing and other changes in form and details may be made therein without departing from the spirit and scope of the invention.

I claim:

1. A pulse-frequency modulation transmission device, comprising:
   a source of modulated direct current, the magnitude of said current varying in proportion to the amplitude variation of an information bearing voltage signal;
   capacitance means in series with said current source for storing a charge at a rate proportional to the magnitude of said current;
   normally open switch means in parallel with said capacitance means, said switch means being adapted to close when the voltage on said capacitance means reaches a predetermined maximum level and to open when the current through said switch means reaches a predetermined minimum level, thereby producing a series of capacitance discharge pulses occurring at intervals descriptive of the magnitude of said modulated current; and
   a laser device in series with said switch means, and laser device emitting, under the influence of said discharge pulses, a series of radiation pulses having a repetition rate corresponding to that of said series of discharge pulses.

2. A pulse-frequency modulation transmission device, comprising:
   a current conduction path;
   voltage supply means connected to said path, said supply means adapted to induce a unidirectional flow of current in said path;
   current control means in series with said path, said control means being adapted to modulate the flow of current in said path in response to an externally applied voltage modulated information bearing signal;
   capacitance means in series with said path for storing a charge at a rate corresponding to the rate of current flow in said path;
   a normally high impedance 4 layer diode switch in parallel with said capacitance means, said 4 layer diode being adapted to break down so as to provide a low impedance discharge path for said capacitance means upon the attainment by said capacitance means of a predetermined maximum level of charge;
   pulse feedback means responsive to the trailing edge of a discharge pulse through said 4 layer diode for applying a current blocking pulse to said current control means so as to allow said 4 layer diode to restore itself to its high impedance state; and
   an injection laser device in series with said 4 layer diode, said laser device emitting a radiation pulse in response to the discharge of a current pulse through said 4 layer diode.

3. A pulse-frequency modulation circuit, comprising:
   a source of modulated direct current, the magnitude of said current varying in accordance with the amplitude variation of an information bearing voltage signal;
   capacitance means in series with said source for storing a charge at a rate proportional to the magnitude of said current;
   a normally high impedance voltage sensitive breakdown device in parallel with said capacitance means, said device being adapted to break down so as to provide a low impedance discharge path for said capacitance means in response to the voltage on said capacitance means reaching a predetermined maximum level; and
   means responsive to the trailing edge of discharge pulses through said breakdown device for momentarily blocking the flow of current through said break down device so as to restore said device to its high impedance state, said device thereby repetitively operating to produce a series of discharge pulses occurring at intervals descriptive of the magnitude of said modulated current.

4. A pulse-frequency modulation circuit, comprising:
   a direct current source;
   a current controlling transistor connected to said source for modulating the magnitude of current from said source in accordaance with the amplitude variation of an information bearing voltage signal;
   capacitance means in series with said source for storing a charge at a rate proportional to the magnitude of said current;
   a normally high impedance 4 layer diode switch in parallel with said capacitance means, said switch being adapted to break down, providing a low impedance discharge path for said capacitance means in response to said capacitance means reaching a predetermined maximum voltage level; and
   pulse feedback means responsive to the trailing edge of discharge pulses through said 4 layer diode for applying a current blocking pulse to said current controlling transistor, thereby allowing said 4 layer diode to restore to its high impedance state, said 4 layer diode switch thereby repetitively operating to produce a series of current pulses at intervals descriptive of the magnitude of said modulated current.

References Cited by the Examiner

UNITED STATES PATENTS

| | | | |
|---|---|---|---|
| 2,683,794 | 7/1954 | Briggs et al. | |
| 3,059,117 | 10/1962 | Boyle et al. | 250—199 X |
| 3,167,661 | 1/1965 | Rhodes | 307—88.5 |
| 3,171,040 | 2/1965 | Goebel | 307—88.5 |

OTHER REFERENCES

Rediker et al.: Electronics, October 5, 1962, vol. 35, No. 10, pp. 44 and 45.

Electronics: "Diode Lasers to Accelerate Optical Communications," November 16, 1962, pp. 24 and 25.

DAVID G. REDINBAUGH, *Primary Examiner.*

J. W. CALDWELL, *Assistant Examiner.*